Patented Sept. 11, 1945

2,384,737

UNITED STATES PATENT OFFICE 2,384,737

CATALYST PRODUCTION

Fritz O. Haas, Villanova, Pa., assignor to Röhm & Haas Company, Philadelphia, Pa., a corporation of Delaware No Drawing. Application December 5, 1941, Serial No. 421,743

5 Claims. (Cl. 252—253)

This invention relates to the catalytic dehydrogenation of saturated aliphatic nitriles. More particularly, it involves the dehydrogenation of aliphatic nitriles at relatively low temperatures by the use of catalysts containing chromium. Specifically, the present invention relates to the production of a chromium oxide catalyst which is of particular merit in dehydrogenation reactions.

The use of this catalyst in the dehydration of nitriles and details of the process of producing unsaturated nitriles are discussed in another application, Ser. No. 421,744, filed simultaneously.

When saturated nitriles are heated below 650° C. without a catalyst, the yields are extremely low; and, when the temperature is raised above 700° C., there occur side reactions which are undesirable and which reduce the yield of unsaturated nitriles. However, when a chromium catalyst, such as will be presently described, is used, very satisfactory yields of unsaturated nitriles will be produced at temperatures between 550° C. and 650° C. with a minimum of side reaction products.

The possible types of reactions which may take place when nitriles are decomposed by heat are here indicated by the use of isobutyronitrile as an example:

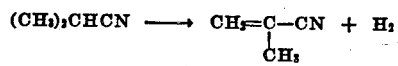

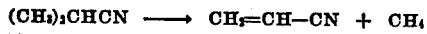

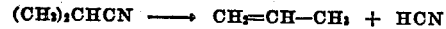

Ordinarily, the first reaction takes place at lower temperatures while the other two are favored by higher temperatures.

I have found that a catalyst, prepared by the carefully regulated reduction of a dichromate salt by the use of a sulfite, serves to catalyze the dehydrogenation of nitriles at temperatures below 650° C. and, hence, prevents the formation of substantal amounts of by-products.

The following examples serve to illustrate my invention.

Example 1

596 g. of $Na_2Cr_2O_7.2H_2O$ was dissolved in five liters of water and 72 g. of a white grade of diatomaceous earth (commercial "Superfloss") was suspended in the solution. 755 g. of sodium sulfite was added during a period of five hours while the solution was vigorously stirred. The precipitate was separated by filtration, washed thoroughly with water and dried at 70° C. The material was then broken into particles of 4-10 mesh size and the particles were heated to 600° C. before use as a catalyst. A yield of 170 grams or 292 cc. of finished dark, vitreous catalyst was obtained.

Example 2

210 g. of $(NH_4)_2Cr_2O_7$ was dissolved in 3 liters of water. 310 g. of $Na_2SO_3$ was added at the rate of 120 g. per hour while the solution was being vigorously stirred. The precipitate was washed by decantation ten times with 10 liters of water in each washing. The material was then filtered, dried, broken and heated as in Example 1. The yield of shiny, hard, vitreous 10-20 mesh particles was 61 g. or 40 cc.

Example 3

Isobutyronitrile was passed over the catalyst of Example 1 at a temperature of 638° C. and a space velocity of 413. "Space velocity" is a measure of the input rate and is defined as the "number of liters of total vapor, calculated at standard conditions, per liter of catalyst per hour." In a single passage through the reaction zone at the above rate 21% of the isobutyronitrile was decomposed and the yield of methacrylonitrile, based on the decomposed isobutyronitrile, was 79%.

In the preparation of the catalyst, the ammonium, potassium, and sodium salts can be used interchangeably. The chief requirement is that the reactants be water-soluble and that all the products of the reaction, except the chromium oxide, remain in solution. Also extenders or inert diluents may be employed as in Example 1. Although extenders are not necessary, they serve to reduce the cost of the catalyst per unit of volume and to impart increased mechanical strength to the catalyst so that the particles will not fracture easily. A catalyst of good mechanical strength is desirable so that subsequent crumbling or pulverizing of the catalyst will not take place with attendant close packing and blocking of the reaction tube in which the catalyst is used. Such materials as silica, silica gel, pumice, diatomaceous earth etc. serve as satisfactory extenders with diatomaceous earth in the refined form serving most satisfactorily. The amount of diluent or extender may vary widely but the preferred amount is 5 to 50% of the final catalyst.

The activity of the catalysts gradually decrease during use and this is believed to be due to accumulation of a carbonaceous deposit on the catalyst. By burning off the deposit with air or a gas mixture containing oxygen at temperatures of 400°–600° C., the activity of the catalyst is restored and numerous reactivations can be performed without loss in activity of the catalyst. It is desirable to maintain the temperature at a minimum during the burning-off in order to avoid damage to the catalyst by overheating. After burning the carbonaceous layer off the catalyst, it is advisable to pass hydrogen over the catalyst before reuse in the catalysis reaction. This treatment, combined with a reduction of the pressure, in order to remove absorbed water vapor, tends to improve the later results.

I claim:

1. The method of preparing a chromium oxide catalyst which comprises reacting, in aqueous solution, a soluble dichromate salt of the group consisting of sodium, potassium, and ammonium dichromate and a sulfite from the group consisting of sodium, potassium, and ammonium sulfite at a temperature sufficiently high and for a sufficient length of time to reduce the dichromate to chromium oxide as a dark gelatinous precipitate, and washing and drying said precipitate to form dark vitreous masses suitable for use as dehydrogenation catalysts.

2. The method of claim 1 wherein an inert extender is suspended in the dichromate solution prior to the addition of the sulfite.

3. The method of claim 2 in which the extender is diatomaceous earth of the white refined grade.

4. The process of claim 1 in which the dichromate is the salt of sodium and the sulfite is the salt of sodium.

5. The process of claim 1 in which the dichromate is the salt of ammonia and the sulfite is the salt of sodium.

FRITZ O. HAAS.